(No Model.)

J. STEPHENSON.
CAR WHEEL LUBRICATOR.

No. 285,082. Patented Sept. 18, 1883.

WITNESSES

INVENTOR,
Joseph Stephenson,
By Palmer Ladd,
Attorneys.

United States Patent Office.

JOSEPH STEPHENSON, OF OSCEOLA MILLS, PENNSYLVANIA.

CAR-WHEEL LUBRICATOR.

SPECIFICATION forming part of Letters Patent No. 285,082, dated September 18, 1883.

Application filed July 6, 1883. (No model.)

*To all whom it may concern:*

Be it known that I, JOSEPH STEPHENSON, a citizen of the United States, residing at Osceola Mills, in the county of Clearfield and State of Pennsylvania, have invented certain new and useful Improvements in Lubricating Car-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to self-lubricating car-wheels, or other wheels or pulleys which revolve on fixed axles. It has more particular reference to that type of wheel in which an annular chamber in the hub of the wheel serves to deliver the lubricant to the axle or bearing.

The object of the invention is to provide an oil-reservoir of a novel construction, and to combine therewith a distributing-chamber, which serves to receive the oil from the reservoir in measured or regular quantities and deliver it to the bearing or axle in an uninterrupted or regular manner; and to these ends the invention consists in the construction and arrangement of parts hereinafter described and claimed.

Figure 1:
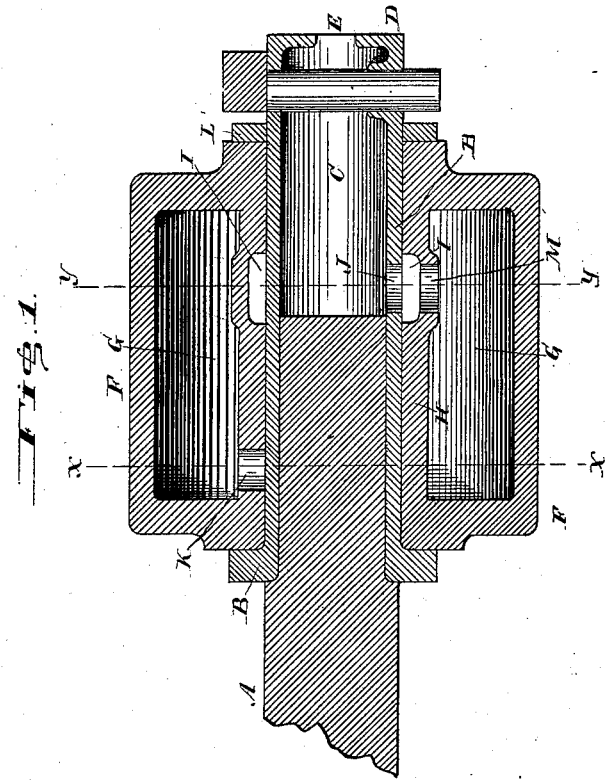
Figure 2:
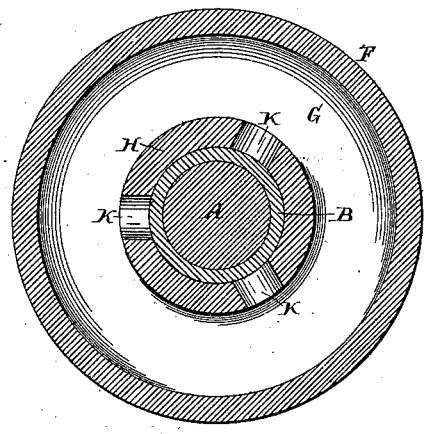
Figure 3:
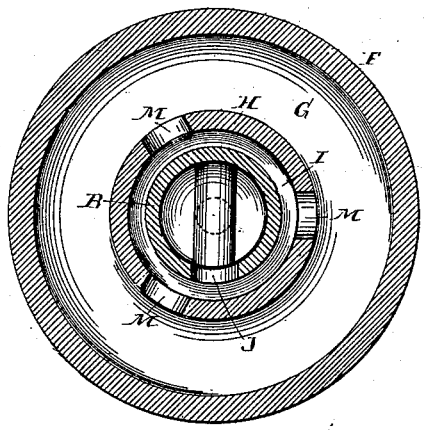

In the drawings, Figure 1 is a longitudinal sectional view of a car wheel and axle constructed according to my invention. Fig. 2 is a transverse section taken through the line *x x*, Fig. 1. Fig. 3 is a transverse section taken through the line *y y*, Fig. 1.

The letter A designates a stationary or fixed axle, and B is a steel or brass sleeve or cylindrical shell shrunk on the end of said axle, or secured thereto in any other approved manner. A portion of the sleeve B projects beyond the end of the axle and constitutes a cylindrical chamber, C, which serves for the reception of oil or other lubricating material. The sleeve B has an end or cap plate, D, in which is made a filling-hole, E, for introducing the lubricant into the chamber C. The hub of the car-wheel or pulley is designated by the letter F, the web and rim portions of the wheel not being shown. This hub is formed with an annular chamber, G, which surrounds the bore or box portion H of the hub, and on the inner surface of said hub, or the box portion thereof, is formed a circumferential groove or channel, I, which communicates with the annular chamber G by means of a series of ports or openings, M, made in the bottom of said groove or channel. The lubricant issues through an opening, J, made in the bottom of the cylindrical chamber, and passes into the groove or channel I, from whence the openings H serve to convey it into the annular chamber G, formed in the hub. At or near the rear end of the chamber G are formed a series of openings, K, which extend through the hub-box and serve to convey the oil upon the outer surface of the sleeve B, or the bearing on which the wheel turns or rotates. A vertical opening made in the outer or chamber portion of the sleeve B serves for the reception of a linchpin that holds the wheel on the axle. A loose washer, L, encircles the sleeve B between the end of the hub and the linchpin, as is seen in Fig. 1.

It will be evident that the oil contained in the reservoir formed by the portion of the sleeve located beyond the end of the axle flows through the bottom opening, J, into the circumferential groove I, and from thence through the openings H into the annular hub-chamber. The latter being in communication with the bearing-surface of the axle, or, more properly, the permanent sleeve or extension thereof, it follows that a supply of oil is conducted to the bearing-surface whenever one of the openings K is uppermost, or in the position shown in Fig. 1.

Having thus described my invention, what I claim as new, and desire to secure by Letters Patent, is—

1. In a self-lubricating car-wheel, the combination of a car-axle having an oil-reservoir at its end, with a wheel-hub provided with an annular chamber having openings for the inflow and discharge of the oil, substantially as herein set forth.

2. In a self-lubricating car-wheel, the combination of the fixed axle having a chambered sleeve or hollow extension provided with a bottom aperture, and the wheel-hub having an annular chamber, a circumferential channel provided with openings, and a second set of openings for delivering the oil to the bearing, substantially as herein set forth.

In testimony whereof I affix my signature in presence of two witnesses.

JOSEPH STEPHENSON.

Witnesses:
    JUSTIN PIE,
    BENJAMIN SYKES.